United States Patent
Canova, Jr. et al.

(10) Patent No.: US 7,571,254 B1
(45) Date of Patent: Aug. 4, 2009

(54) MUTUAL SCHEDULING OF EVENTS ON HANDHELD COMPUTERS

(75) Inventors: Francis J. Canova, Jr., Fremont, CA (US); Neal Osborn, Milpitas, CA (US); E. Michael Lunsford, San Carlos, CA (US)

(73) Assignee: Access Systems Americas, Inc., Sunnyvale, CA (US)

(*) Notice: Subject to any disclaimer, the term of this patent is extended or adjusted under 35 U.S.C. 154(b) by 973 days.

(21) Appl. No.: 09/571,083

(22) Filed: May 15, 2000

(51) Int. Cl.
  *G06F 15/16* (2006.01)
(52) U.S. Cl. .................................................. 709/248
(58) Field of Classification Search ................ 709/214, 709/205, 248; 707/201
  See application file for complete search history.

(56) References Cited

U.S. PATENT DOCUMENTS

| | | | | |
|---|---|---|---|---|
| 4,363,093 A | * | 12/1982 | Davis et al. ................. 709/227 |
| 5,519,606 A | * | 5/1996 | Frid-Nielsen et al. .......... 705/9 |
| 6,141,664 A | * | 10/2000 | Boothby ..................... 707/201 |
| 6,144,997 A | * | 11/2000 | Lamming et al. ............ 709/217 |
| 6,308,201 B1 | * | 10/2001 | Pivowar et al. .............. 709/214 |
| 6,330,618 B1 | * | 12/2001 | Hawkins et al. ............. 709/248 |
| 6,360,272 B1 | * | 3/2002 | Lincke et al. ............... 709/238 |
| 6,457,062 B1 | * | 9/2002 | Pivowar et al. .............. 709/248 |
| 6,553,037 B1 | * | 4/2003 | Pivowar et al. .............. 370/463 |

* cited by examiner

*Primary Examiner*—J Bret Dennison
(74) *Attorney, Agent, or Firm*—Hickman Palermo Truong & Becker LLP

(57) ABSTRACT

An embodiment of the invention provides a method for scheduling an event. The method includes signaling a request from a first computer to schedule an event to a second computer. A schedule is then received from the second, the schedule includes indicators of available time periods in the calendar period from the second computer. A consolidated schedule is then generated. The consolidated schedule comprises information comparing the indicators of available time periods from the second computer with indicators of available time periods from the first computer.

21 Claims, 8 Drawing Sheets

MUTUAL SCHEDULING OF EVENTS ON HANDHELD COMPUTERS

BACKGROUND OF THE INVENTION

1. Field of the Invention

This invention relates to the field of handheld computers. More specifically, the invention relates to a method and apparatus for exchanging information for scheduling events between users of different computers.

2. Description of the Related Art

Handheld computers, organizers and PDA devices provide users with the ability to store and display a variety of personal information. This includes calendar and scheduling information. To match scheduling information between two or more such devices, handheld computers typically require users to communicate verbally or manually regarding scheduled items.

SUMMARY OF THE INVENTION

An embodiment of the invention provides a system and method for scheduling an event between two or more handheld computers. Embodiments of the invention enable users to share, consolidate and display scheduling information on two or more handheld computers. Further, the scheduling information can be customized for each user of each handheld computer.

DETAILED DESCRIPTION

A. System Overview

Figure 1:
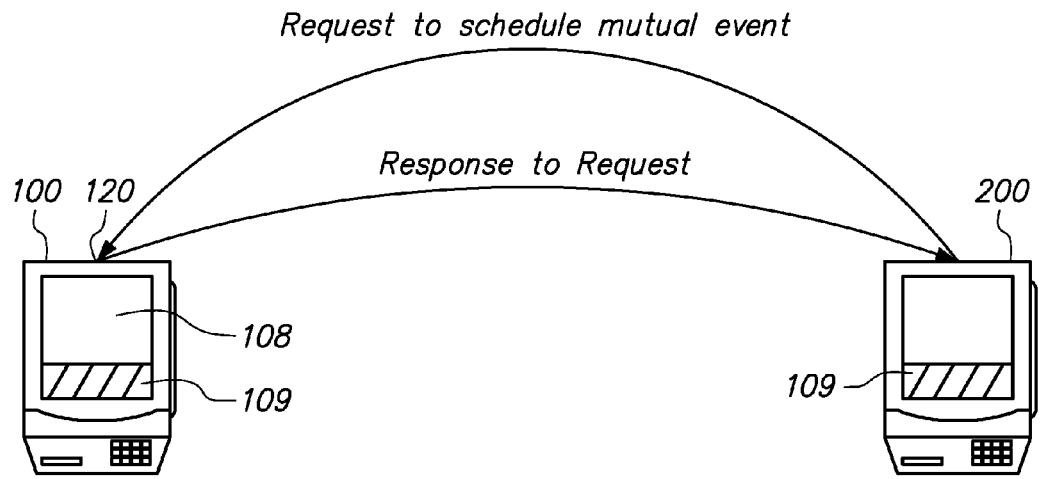
FIG. 1 is a block diagram illustrating a first computer signaling a second computer, under an embodiment of the invention.

FIG. 1 illustrates a first handheld computer 100 signaling a request to a second handheld computer 200, under an embodiment of the invention. The request is to schedule a mutually desirable event. The request includes schedule information of the user of the first computer 200. In an embodiment, a response of the second computer includes scheduling information of the user of the second computer 200. Handheld computers 100 and 200 then each generate and display a consolidated schedule.

In an embodiment, the displayed consolidated schedule is a user interface that combines the individual schedules of handheld computers 100, 200. The consolidated schedules distinguish scheduled events of a first user from that of a second user. Preferably, the events of the first user are graphically distinguished from those of a second user. The consolidated schedule may also graphically distinguish free time periods available to both users.

Handheld computer 100 includes a display 108. All or portions of display 108 can be a user interactive display. The user interactive display can include a Graffiti™ writing section 109 for data entry. In an embodiment, portions of display 108 are touch sensitive display so as to enable data entry through contact with the display. In various embodiments touch-sensitive displays can be configured for finger contact or contact with a stylus or other writing implement. Portions of touch sensitive display 108 can include application features, such as icons to select application programs. Examples of application programs include electronic calendars, address books, to-do lists, memo pad. The calendar application allows the user to maintain and update an electronically displayed calendar of events.

Handheld computer 100 can include one or more communication ports. Handheld computer 100 is shown to break a wireless port 120. Communication ports can include wireless ports and physical ports. Examples of wireless ports include infra-red ports and radio frequency ports. The wireless port 120 may include an antenna or an IR receiver transmitter. In an embodiment, the wireless ports may be operated using specifications provided by the Bluetooth consortium. Specifically, the use of RF and the Bluetooth protocol allows communication with other handheld computers and devices within an RF network.

Both the wireless and physical ports can signal to a UART (universal asynchronous receiver and transmitter) controller integral to hand-held computer 100. This configuration allows handheld computer 100 to communicate with external devices and other handheld computers via infra-red (IR) or RF communication.

Examples of handheld computers include for use with embodiments of the invention, the Palm III®, Palm V®, Palm VII°, Palm OS®, and other handheld Handspring, Window CE device, pagers, cellular phones and the like. In other embodiments, wireless port 120 can be configured for serial peripheral interface (SPI) between handheld computer 100 and external devices wireless devices.

In use, wireless port 120 allows handheld computer 100 to signal other handheld computers and devices. This can include, but is not limited to, polling for the presence of other computers, requesting the scheduling of a mutual event, responding to the request, and exchanging information including calendar and scheduling information. The communication can be done using infra-red, RF or another electromagnetic medium.

Figure 2:
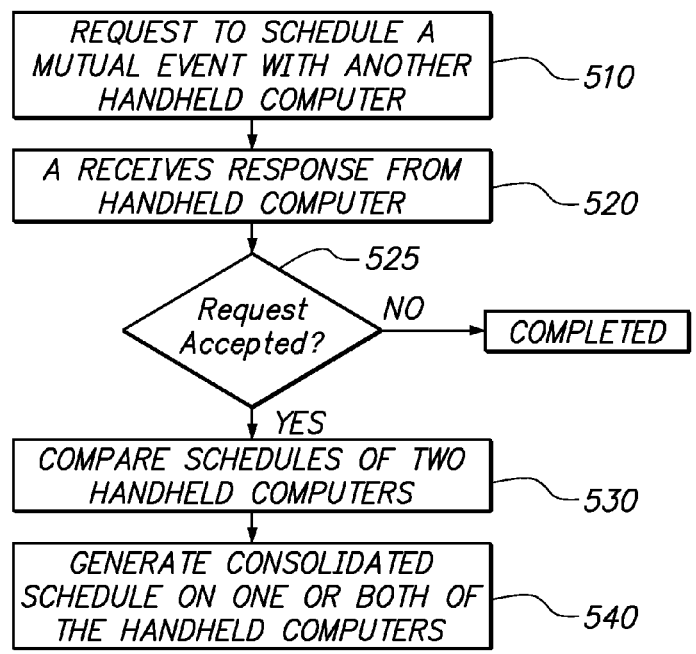
FIG. 2 is a flow chart for scheduling an event between a first and second handheld computer, under an embodiment of the invention.

FIG. 2 is a flow chart illustrating the process of scheduling a mutually acceptable event between two or more handheld computers. The process is initiated at block 510 where the first handheld computer 100 signals a request to schedule an event at a mutually acceptable time period to the users of handheld computers 100 and 200. The request may include the signal of a schedule for a first user on the first handheld computer 100. The event scheduling process can be initiated through the touch, tap or selection of a user-interactive feature icon on first user display 108, second user display 208, or other computer display.

The request by handheld computer 100 may be in the form of sending a calendar block to handheld computer 200. This is a time period on a schedule where some or all of the period is marked occupied (e.g. scheduled) or otherwise designated for particular uses. The calendar block may be a day, week or a time period occurring receptively over a month, etc. The calendar block may be identified from a calendar application on the user's terminal or manually inputted by the user. Alternatively, the request may be in the form of proposing available time slots or time periods in a user of handheld computer 100's schedule.

The process then proceeds to blocks 520 and 525 where the second handheld computer 200 receives (block 520) and then responds (block 525) to the request. The response can be in the form of a calendar block corresponding to a user of handheld computer 200's schedule. If the second handheld computer 200 accepts the request, the second handheld computer 200 signals a schedule for a second user back to handheld computer 100 and the process proceeds to block 530. If the second computer 200 does not accept the request, the process goes to block 526.

At block 530 the first or second handheld computer 100, then compares schedules of the users of the first and second computers 100, 200. In block 540, a consolidated schedule is generated on one or both computers 100, 200 for a selectable calendar period including days, weeks, months, years, etc. The consolidated schedule can be generated in the form of a user interface and includes time slots for the scheduled events for the users of first and second computers 100, 200. An example of a consolidated schedule is provided by FIGS. 4B-4D.

The consolidated schedule shows available time in the calendar that is available to the users of both handheld computers. It may also identify time periods unavailable to only one of the users of the handheld computers or to neither. The consolidated schedule can be displayed in a time block format for selectable calendar periods including days, weeks, months, years, etc. The consolidate schedule can also have selection boxes/buttons to allow the displayed time period of the consolidated schedule to be stepped through, expanded or narrowed.

Figure 3:
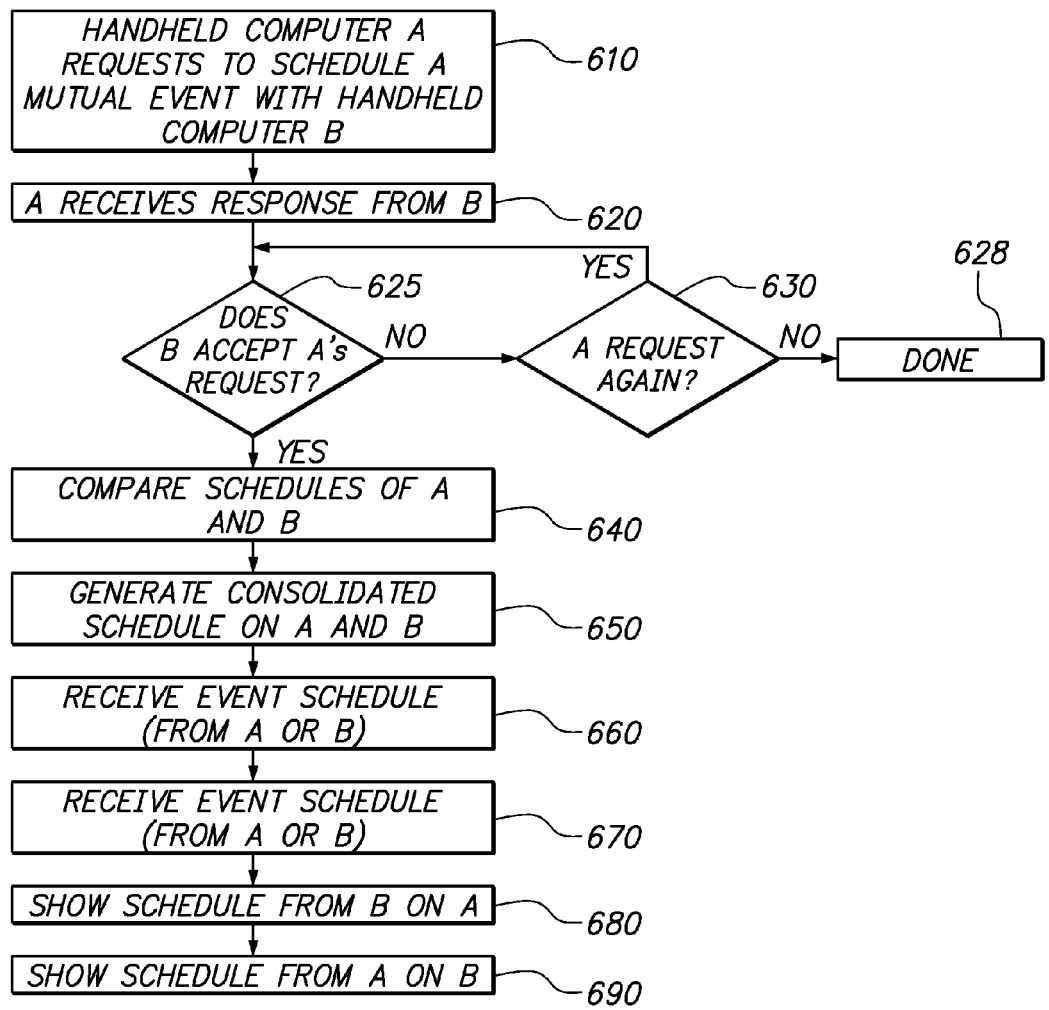
FIG. 3 is a flow chart for scheduling an event between a first and a second handheld computer, under another embodiment of the invention.

FIG. 3 depicts another embodiment of the scheduling process that can be performed by scheduling application 304. In this embodiment, the consolidated schedule is generated on both handheld computers 100, 200. Further, each consolidated schedule may be configured by the user of the respective handheld computers 100, 200.

The process is initiated at block 610, where a first handheld computer 100 (termed user A in FIG. 3) signals a request to a second handheld computer 200 (termed user B in FIG. 3) to schedule a mutual event between the two. The process proceeds to block 620 where the second computer/user signals its response to the request back to the first computer. The process proceeds from block 620 to 625, where a determination is made as to whether the second computer/user has accepted the request. If yes, then the process proceeds to block 340. If no, then the process proceeds to block 630 where a second request is made. If the answer to the second request is yes, then the process proceeds to block 640. If the answer is no, then the process stops at block 628. At block 640, the schedules of the two users are compared. This step may be performed on either the first or the second handheld computer. The process proceeds to block 650 where a consolidated schedule is generated on the first and second handheld computer 100, 200. In block 660, a proposed mutual event is scheduled by either the user of the first or second handheld computer 100, 200. In block 670, the scheduled event is then signaled to and received by the other user. In block 680, the scheduled event is displayed on the first handheld computer 100.

FIGS. 4A-4D illustrate a series of user-interface under an embodiment of the invention. The calendar 330 can be displayed by the scheduling application in a time block format 332. The calendar displays a period of a week. The week may correspond to a calendar block signaled to handheld computer 200 as a request to schedule a mutually scheduled event.

A plurality of graphic indications indicate available and unavailable time periods for the user of handheld computer 100. The graphical indications can include an indicator for a time slot 336 and a scheduled event 340, with events 340 being scheduled for one or more time slot 336. Time slots 336 and events 340 for each user can be stored, retrieved and displayed in calendar 330 by the scheduling application.

Figure 4A:
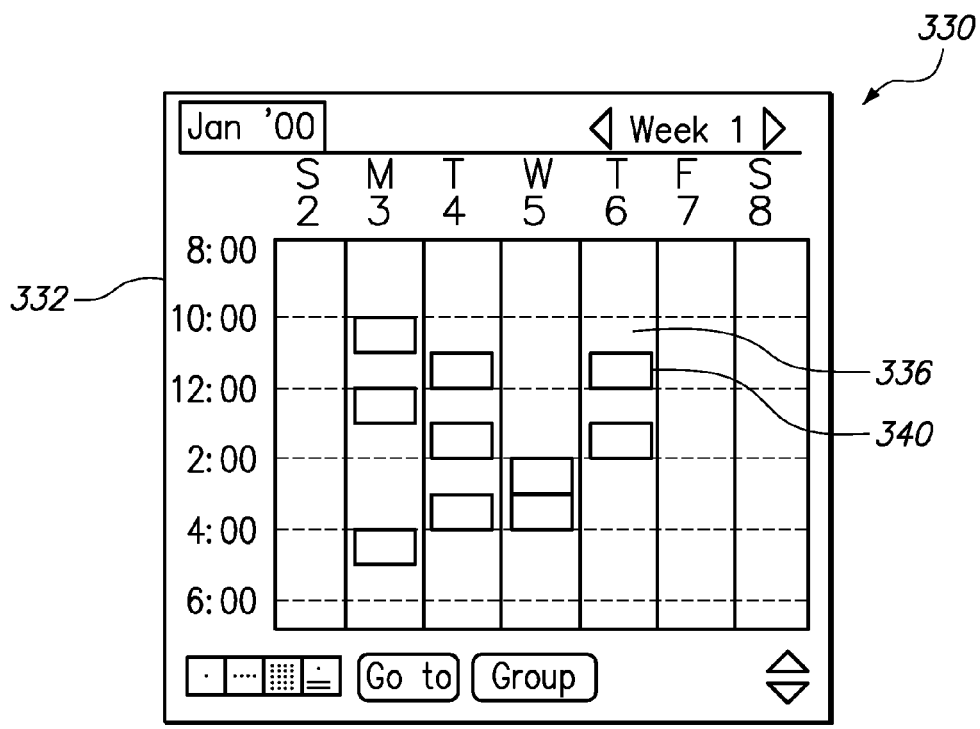
FIG. 4A illustrates an embodiment of a user-interface display for a handheld computer, under an embodiment of the invention.
Figure 4B:
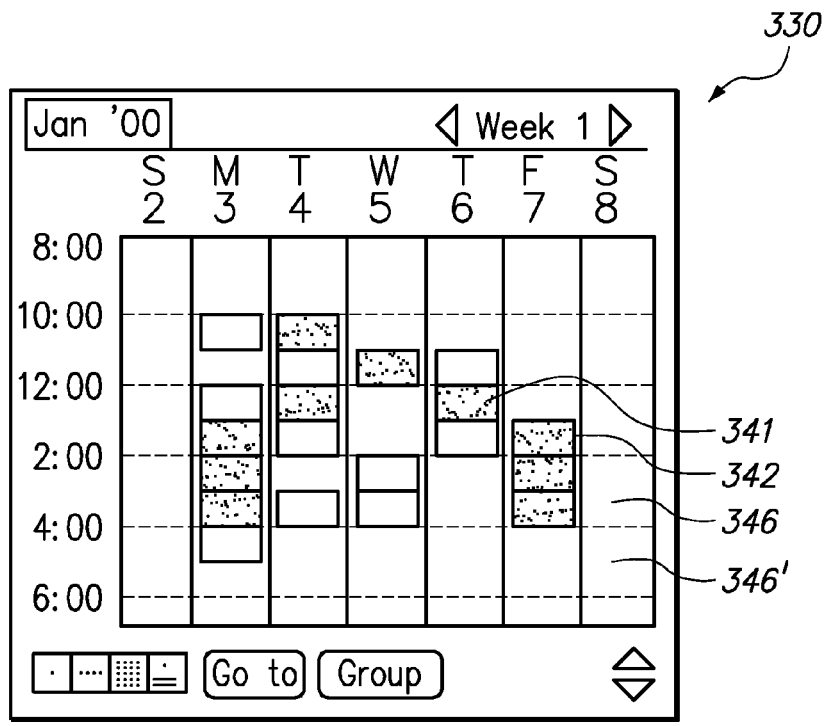
FIG. 4B illustrates a consolidated schedule displayed on a handheld computer, under an embodiment of the invention.

FIG. 4B illustrates a consolidated schedule that is generated by combining the calendar block of handheld computer 100 with a corresponding calendar block of handheld computer 200. The consolidated schedule may represent available or unavailable time periods to one or all handheld computers 100, 200. In an embodiment, additional information about each of the unavailable time periods may also be provided.

The consolidated schedule includes a plurality of graphical indicators. These include scheduled event periods (e.g. unavailable periods) 341 for the user of handheld computer 100, scheduled events periods 342 for the user of handheld computer 200 and common available periods to both users called free periods 346. These indicators distinguish event periods 341 from event periods 342 as well as free periods 346.

Scheduled event periods 341, 342 and free periods 346 can be distinguished by the use of different, shading, patterns, color or gray-scale. In an embodiment first user events 341 may be solid blocks, second user events 342 may be shaded blocks and free periods 346 may be white blocks. This configuration provides the benefit of allowing free periods 346 to be quickly discernible to all users and also minimizes the memory requirements for displaying the schedule.

Figure 4C:
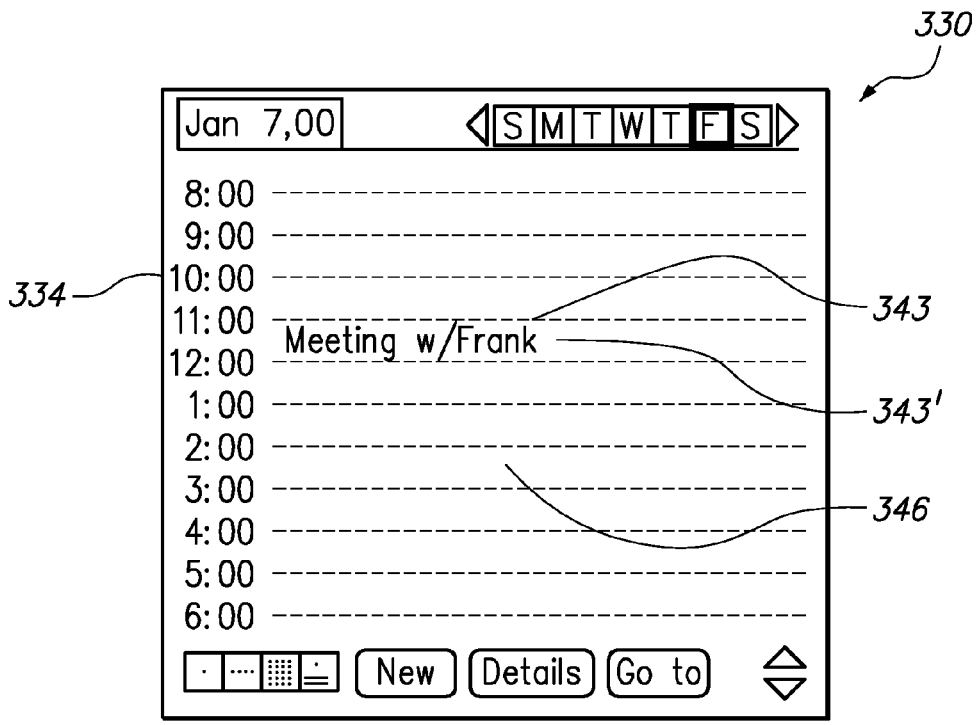
FIG. 4C illustrates a consolidated schedule displayed on a first handheld computer, including a mutually scheduled event with the second handheld computer, but customized for a first user, under an embodiment of the invention.
Figure 4D:
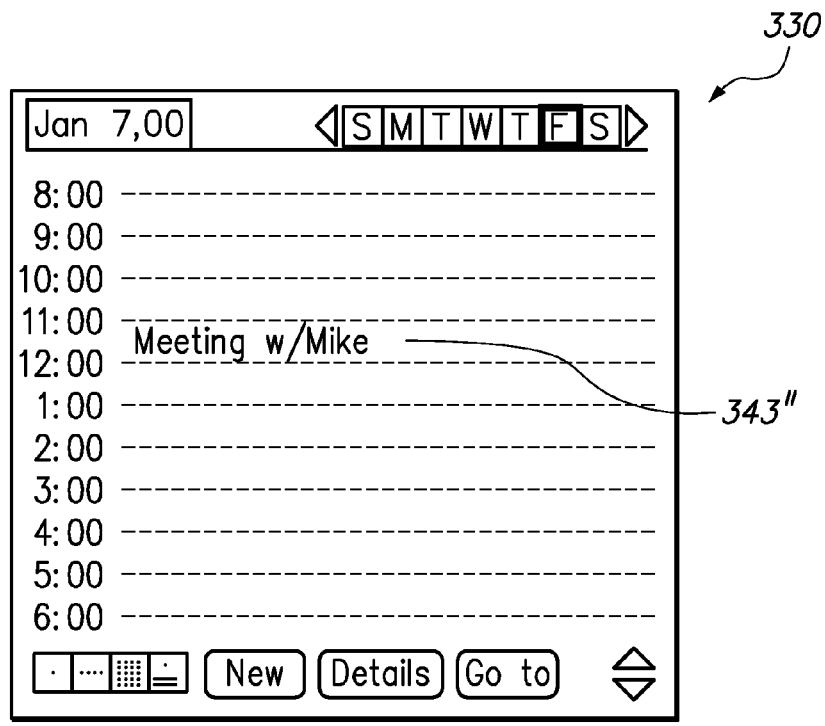
FIG. 4D illustrates an embodiment of the consolidated schedule displayed on a second handheld computer, including a mutually scheduled event with the first handheld computer, but customized for a second user, under an embodiment of the invention.

FIGS. 4C and 4D illustrates the calendar after the consolidated schedule is formed for each handheld computer 100, 200. If the calendar is displayed in more detail, such as in a day mode, the selected mutually scheduled event is displayed in a format that is specific to the user of the handheld computer displaying the consolidated schedule. For example, if "Mike" is using handheld computer 100 and "Frank" is used handheld computer 200, then on handheld computer 100, the mutually scheduled event automatically appears as "Meeting with Frank". Similarly on handheld computer 200, the mutually scheduled event automatically appears as "Meeting with Mike"

In an embodiment either user can choose or propose a commonly scheduled event 343 by taping, touching or otherwise selecting the screen portion area 346' (FIG. 4B) corresponding to one or more free periods 346. Doing so then displays a datebook format display 334 (FIG. 4C) in which the select time period 346 is highlighted. The user can then enter text information (via the touch screen or other input means) in order to enter a common event 343 for the selected free period 346. Alternatively, common event 343 between one or more users can be automatically displayed in user-customized formats 343', 343" as shown in FIGS. 4C and 4D. The customization can be done before, during, or after the exchange of scheduling information between the first and second and other participating handheld computers.

Figure 5:
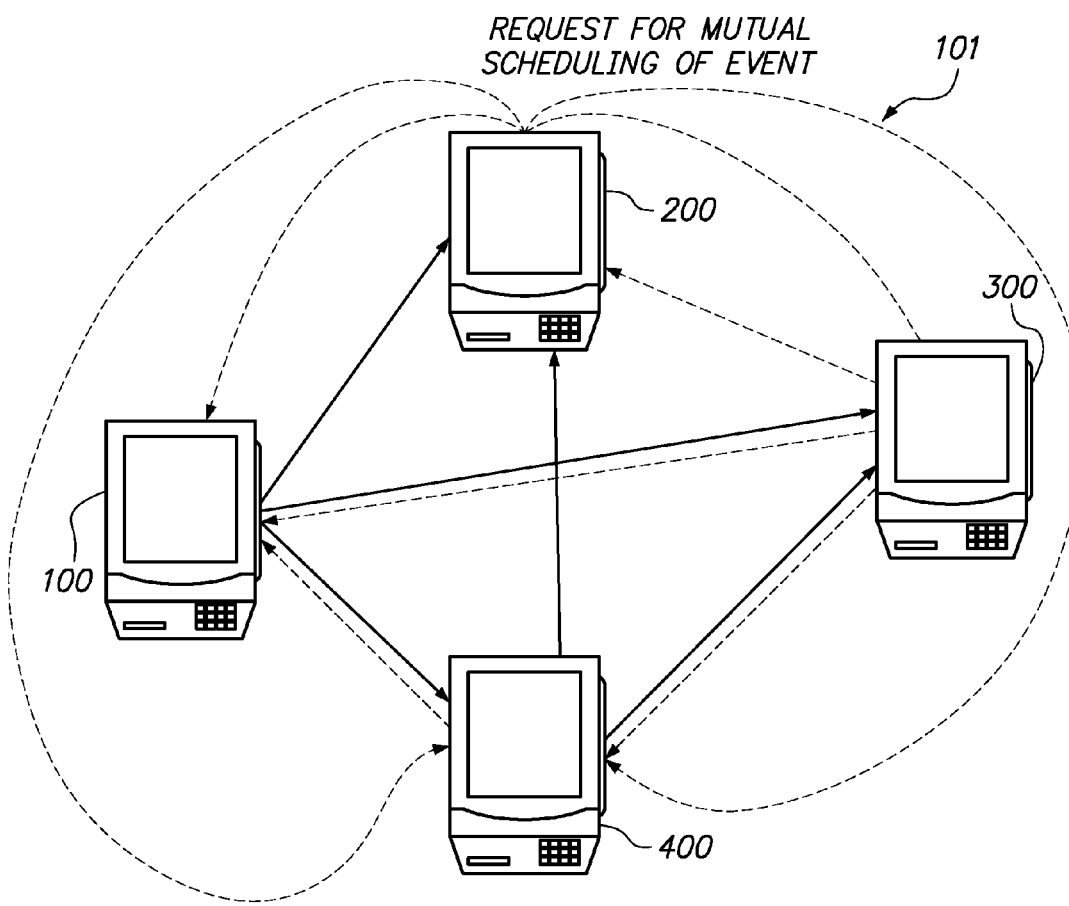
FIG. 5 is a schematic illustration of a peer-to-peer configuration for scheduling an event between a plurality of handheld computers, under an embodiment of the invention.

FIG. 5 illustrates an embodiment for scheduling an event between a plurality of handheld computers which can include a first, second, third and fourth handheld computer 100, 200, 300, 400. In this embodiment all handheld computers in the plurality are configured in a peer-to-peer configuration. The peer-to-peer configuration allows any computer in the plurality to poll, signal and request a mutual scheduled event to any or all other computers in the plurality as is shown in FIG. 5. In one embodiment, communication with the plurality of computers uses the Bluetooth protocol.

In an embodiment such as shown in FIG. 5, handheld computer 100 polls a region (e.g. a room in a building) for other nearby handheld computers using RF communication and protocols (e.g. Bluetooth). The polling includes a request to schedule a mutually desired event. The request may include scheduling information to enable scheduling of the mutually desired event.

For the purpose of describing the peer-to-peer configuration, a plurality of handheld computers are assumed to respond to the request. The response includes signaling calendar blocks located on each of the responding handheld computers. The calendar blocks may be signaled to all of the handheld computers that responded to being polled. Each handheld computer then generates a consolidated schedule based on the calendar blocks received from all of the responding handheld computers.

The polling and responses may include identifiers so that the users of handheld computers 100-400 know which other users are responding. In an embodiment, the identifiers may be provided by identifications on the handheld computers.

Figure 6:
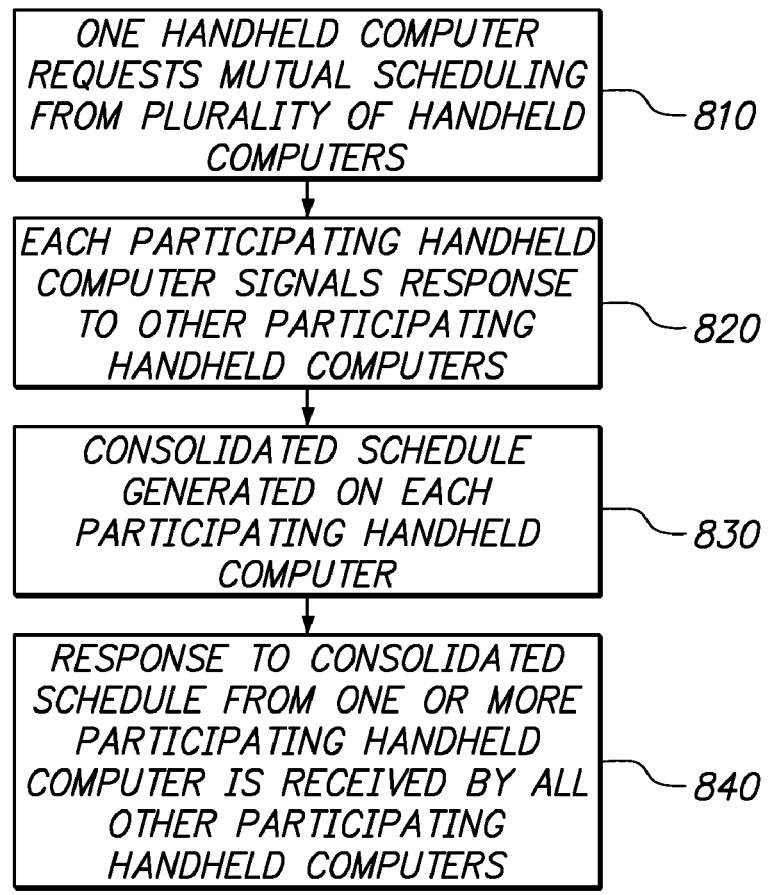
FIG. 6 is a process flow chart of the embodiment such as shown in FIG. 5, illustrating the process of scheduling an event between a plurality of handheld computers in the peer-to-peer configuration.

FIG. 6 is a flow chart illustrating the process of scheduling an event 340 for the plurality of computers 101 in a peer to peer configuration. The process starts at block 810 where one handheld computer in the plurality polls to determine the presence of other computers and then signals a request for a mutually scheduled event to the other computers in the plurality. The process then moves to block 820, where each participating computer in the plurality signals their response to all other participating computers in the plurality. The process then proceeds to block 830 where a consolidated schedule is generated on each participating computer in the plurality.

In an embodiment, users of handheld computers 100-200 can also respond to the consolidated schedule after the consolidated schedule is generated. In block 840 the response to the query for a mutually scheduled event by one or more participating computers in the plurality is received by the remaining participating computers in the plurality.

The use of embodiments described in FIGS. 5 and 6 can be illustrated by way of the following example. One person in a lunch room uses a handheld computer to poll for other users in the lunchroom. The poll is a request. The request may be signaled to users as "Request for meeting from Mike." Only some of the users in the lunchroom respond. Non-responding users know that they are unavailable for a meeting, or may not know Mike. If the users respond "Yes", then their handheld computers signals to all of the responding computers a calendar block identified by the original request. Once each handheld computer receives a calendar block from all of the other handheld computers, then each handheld computer generates a consolidated schedule such as shown in FIG. 4B.

Figure 7:
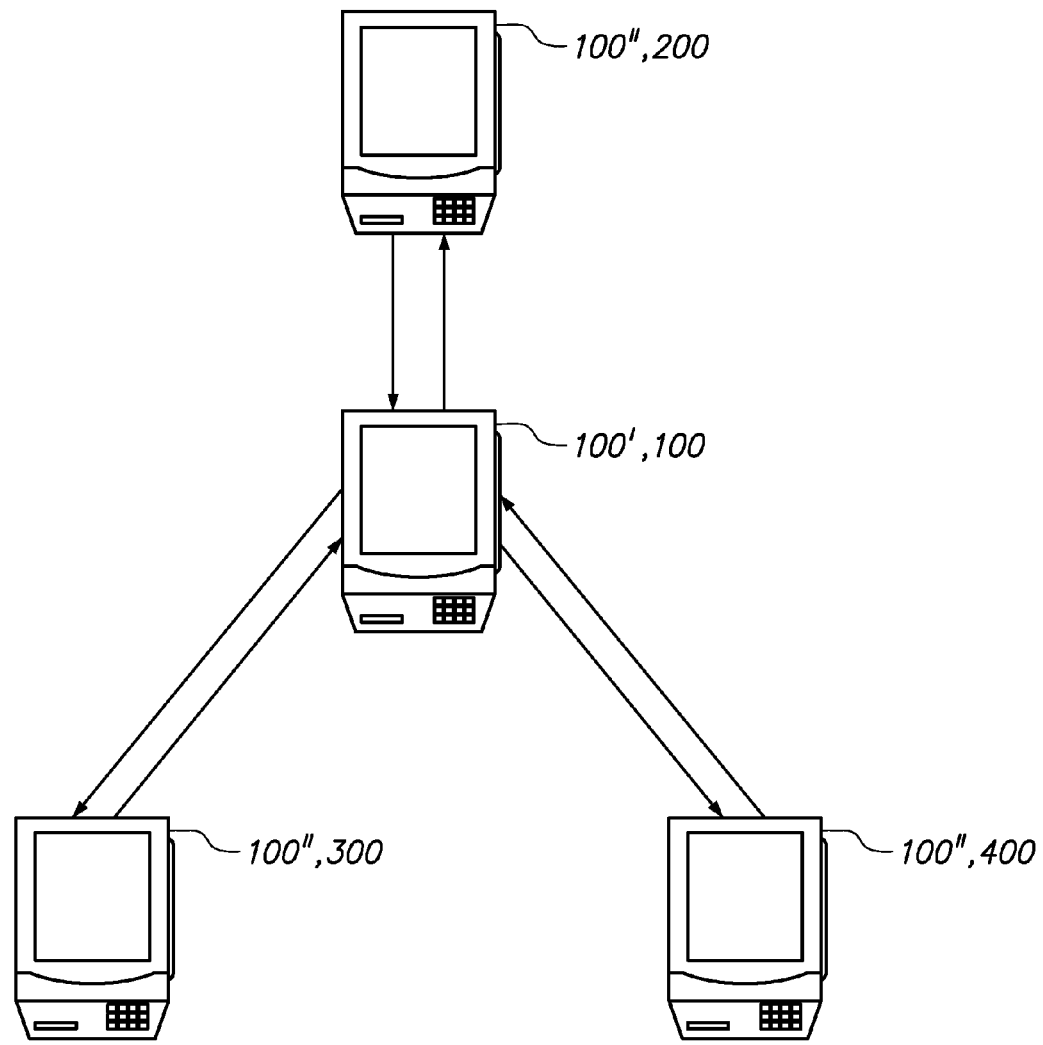
FIG. 7 is a schematic illustration of a master-to-peers configuration for scheduling an event between a plurality of handheld computers, under an embodiment of the invention.

FIG. 7 illustrates an embodiment for scheduling an event between a plurality of handheld computers in a master-peers configuration. For purposes of description, requesting handheld computer 100 is provided the role of master in a master-peers organization. Other embodiments may designate another handheld computers as the master.

The requesting handheld computer polls a region for users to request a mutually scheduled event. Some users respond. In this embodiment the responding handheld computer signals calendar blocks only to the requesting handheld computer 100 which is assumed to be the master. The requesting handheld computer 100 then generates a consolidated schedule. The requesting handheld computer 100 then signals the consolidated schedule to the handheld computers 200, 300, 400.

Figure 8:
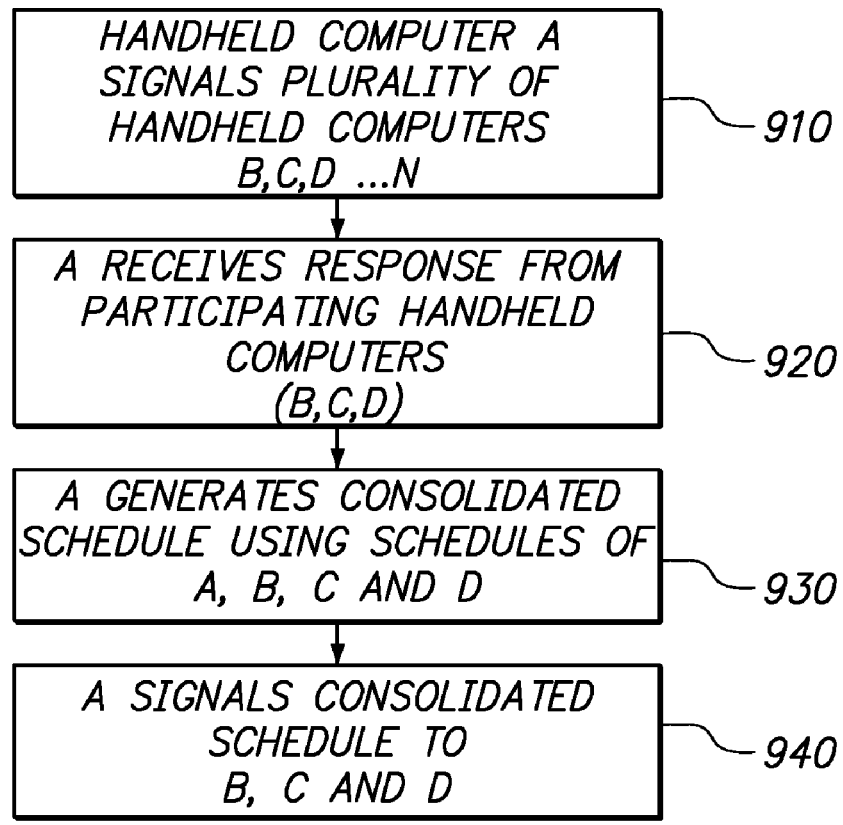
FIG. 8 is a process flow chart of an embodiment such as shown by FIG. 7, illustrating the process of scheduling an event between a plurality of handheld computers for the master-to-peers configuration.

FIG. 8 is a flow chart illustrating the process of scheduling an event for the plurality of computers in a master-peers configuration. The process starts a block 910 where requesting handheld computer A signals a plurality of handheld computers B, C, D . . . N. The handheld computers may all be located in a region. The signal may request for a mutually scheduled desired meeting. The signal may also include a calendar block from handheld computer A. The signal may also be a poll to determine who the users of the other handheld computers are. The process then moves to block 920 where some of the peer computers (BCD) in the plurality signals their response to the master peer computer A. The process then proceeds to block 930 where a consolidated schedule is generated by A. The process then moves to block 940 where the consolidated schedule is signaled by A to participating peer computers B,C,D.

In an alternative embodiment, A only signals the consolidated schedule to B,C, D and B,C, D respond to the consolidated schedule. In this embodiment A may make the ultimate scheduling decision using the consolidated schedule and/or the responses to the consolidated schedule.

In embodiments such as described with FIGS. 5-8, scheduled events that appear on each handheld computer in master-peers or peer-peer show scheduled events customized for users of each respective handheld computer.

B. Alternative Embodiments

In an alternative embodiment the scheduling application of handheld computer 100 can be configured to include graphical coded indications of the attributes of the pre-scheduled (e.g. blacked out) time or events of one or more users. Such attributes could include event priority, location (onsite, offsite local, offsite, distant), business or personal meeting, size of group attending (e.g. number, group department etc). The graphical indication could include patterns, gray scale coding, color coding, or pattern coding (e.g. cross hatching, patterned dots etc.). The type, number and coding of these additionally displayed attributes can be configured to be selectable by the user through a selection box on a general display or other menu or other selection means known in the art. The selection box can be provided on a touch or tap sensitive portion 109, 209 of display 108 or 208.

In another alternative embodiment, the scheduling application can be configured to compare the schedule from the user of computer 100 to that of a second user on computer 200 and graphically display common free time slots on computer 100 and/or 200 using a color, gray-scale or pattern code described herein. The scheduling application could be configured to display common free time slots starting at a selectable date (e.g. either the current or future date) and duration in the future (e.g. a day, a week a month etc.).

In a related embodiment the scheduling application could include a ranking module or subroutine configured to rank the desirability of common free time slots based on one or more selectable attributes. These attributes could include geographic proximity of users, priority of preceding/proceeding meetings, duration of other free time slots before and after common free time slots. The scheduling application could be further configured to display the ranking of the common free time slots within the schedule display of the common free time slot or to provide a numeric list of the ranked common free time slots. The type and number of attributes used to generate the ranking can be selectable by one or more users. Further, each attribute can be given a selectable weighting by one or more users. The ranking module could in turn use this weighting to perform the ranking. The ranking module can include "fuzzy logic" algorithms, heuristic rules and programming methods known in the art to establish the ranking.

In another embodiment the operating system of handheld computer 100 can be configured to signal, compare and consolidate a schedule to one or more other handheld computers 200 over a network such as the Internet, local area network or wide area network. In these and related embodiments, the operating system and scheduling application can be configured to operate or otherwise communicate using HDML (Handheld Device Markup Language). In another embodiment, electronic calendar 330 can be a database including a relational database that is stored in memory resources 110 of computer 100.

CONCLUSION

The foregoing description of various embodiments of the invention has been presented for purposes of illustration and description. It is not intended to limit the invention to the precise forms disclosed. Obviously, many modifications, variations and different combinations of embodiments will be apparent to practitioners skilled in the art. Also, it will be apparent to the skilled practitioner that elements from one embodiment can be readily recombined with one or more other embodiments

What is claimed is:

1. A method for scheduling an event using a first computer and a second computer, the method comprising:
    transmitting a signal between the first computer and the second computer to request to schedule one or more new events;
    wherein a first scheduling application that resides on the first computer has a first set of events;
    wherein a second scheduling application that resides on the second computer has a second set of events;
    programmatically generating a consolidated schedule of available time periods of the first scheduling application and available time periods of the second scheduling application;
    wherein programmatically generating a consolidated schedule includes comparing versions of different sets of events, said versions including a version of the first set of events and a version of the second set of events;
    using the consolidated schedule to schedule a proposed event;
    wherein the proposed event is not a member of any version of any set of events compared to generate the consolidated schedule;
    the first computer transmitting a request to the second computer to schedule the proposed event;
    the first computer receiving a message from the second computer;
    if the message indicates that the proposed event can be scheduled, causing the first computer to update the first scheduling application to reflect that the proposed event is scheduled,
        wherein the second scheduling application has been updated to reflect that the proposed event is scheduled; and
    if the message indicates that the proposed event cannot be scheduled, then the first computer causing no update to the first scheduling application.

2. The method of claim 1, wherein generating a consolidated schedule includes displaying a calendar period having graphic indications of available time periods based on the available time periods of the first computer and the second computer.

3. The method of claim 2, wherein displaying a calendar period having graphic indications includes displaying a calendar period with at least one of shading, coloring, or patterning that indicates the available time periods of the first computer and the second computer.

4. The method of claim 2, wherein displaying a calendar period having graphic indications includes displaying the calendar period with a first graphic indication of available time periods of only the first computer, a second graphic indication of available time periods of only the second computer, and a third graphic indication of available time periods of both the first computer and the second computer.

5. The method of claim 4, wherein the first graphic indication is at least one of shading, coloring, or patterning showing unavailable time periods on the first computer, the second graphic indication is at least one of shading, coloring, or patterning showing unavailable time periods on the second computer, and the third graphic indication is at least one of shading, coloring, or patterning showing the unavailable time periods of both the first computer and the second computer.

6. The method of claim 4, further comprising:
    ranking available time periods as a function of an attribute.

7. The method of claim 6, wherein the attribute is at least at least one of a geographic location, an event priority, time proximity to a preceding event or time proximity to a proceeding event.

8. The method of claim 6, wherein the attribute is a plurality of attributes.

9. The method of claim 6, further comprising:
    displaying a ranking of available time periods in at least one of a graphical, graphical indicator or an alphanumeric format.

10. The method of claim 1, further comprising receiving a selection of an available time period for the event.

11. The method of claim 10, further comprising signaling the available time period to the second computer.

12. The method of claim 10, further comprising receiving a selected available time period from the second computer.

13. A system for scheduling events, the system comprising:
    a first computer, the first computer including a first processor for operating a first scheduling application that maintains a first schedule;
    a second computer, the second computer including a second processor for operating a second scheduling application to maintain a second schedule;

wherein at least one of the first computer and second computer is configured to signal through a communication port a request to schedule one or more new events with another scheduling application on another computer;

wherein at least one of the first computer and the second computer is configured to receive through a communication port the request to schedule the one or more events with the another computer;

wherein the first schedule has a first set of events and the second schedule has a second set of events;

wherein the first computer or the second computer is configured for generating a consolidated schedule of available time periods of the first schedule and the available time periods of the second schedule;

wherein generating a consolidated schedule includes comparing versions of different sets of events, said versions including a version of the first set of events and a version of the second set of events;

wherein the first computer is configured to use the consolidated schedule to schedule a proposed event;

wherein the proposed event is not a member of any version of any set of events compared to generate the consolidated schedule;

wherein the first processor is configured to transmit a request to the second computer to schedule the proposed event;

wherein the first processor is configured to receive a message from the second computer;

wherein, if the message indicates that the proposed event can be scheduled, the first processor is configured to update the first scheduling application that reflects that the proposed event is scheduled,
wherein the second scheduling application has been updated to reflect that the proposed event is scheduled; and wherein, if the message indicates that the proposed event cannot be scheduled, then the first processor is configured to cause no update to the first scheduling application.

14. The system of claim 13, wherein the processor is configured to display a calendar that includes a plurality of indicators, the plurality of indicators indicating available time periods on the respective first and second schedules.

15. The system of claim 14, wherein the plurality of indicators includes at least one of shading, coloring or patterning.

16. The system of claim 14, wherein the display of the calendar includes a plurality of indicators that combine the plurality of indicators from the first schedule with the plurality of indicators from the second schedule.

17. The system of claim 13, wherein at least one of the first computer or the second computer is a handheld computer.

18. The system of claim 13, wherein at least one of the first computer or the second computer is a device selected from a cell phone, handheld computer, or laptop computer.

19. The system of claim 13, wherein the first communication port and the second communication port are each selected from a group consisting of a radio frequency communication port, an infra-red communication port, and a Bluetooth enabled communication port.

20. The method of claim 1, wherein:
the first computer and the second computer are handheld computers;
the steps of the method further include the first computer transmitting signals to poll other handheld computers;
the step of transmitting signals includes said signaling to a second computer a request to schedule one or more new events; and
the signals are directly transmitted, via a wireless connection, to the other handheld computers without participation of another computer in transmitting the signals.

21. The method of claim 20, wherein:
programmatically generating a consolidated schedule includes automatically operating a consolidated schedule comprising conflicting events that overlap a time period.

* * * * *